Patented Apr. 10, 1951

2,548,654

UNITED STATES PATENT OFFICE 2,548,654

N¹-ARYL N⁵-DIALKYL BIGUANIDES

Francis Henry Swinden Curd and Francis Leslie Rose, Blackley, Manchester, England, assignors to Imperial Chemical Industries Limited, a corporation of Great Britain No Drawing. Original application May 25, 1945, Serial No. 595,892. Divided and this application April 13, 1949, Serial No. 88,028. In Great Britain May 10, 1944

Section 1, Public Law 690, August 8, 1946
Patent expires May 10, 1964

3 Claims. (Cl. 260—565)

This invention relates to the manufacture of new biguanide derivatives and more particularly to the manufacture of biguanides bearing either two, three or four substituents upon the terminal nitrogen atoms. The said new compounds are useful as chemotherapeutic agents or as intermediates for chemotherapeutic agents; many of them are valuable antimalarial agents.

According to the invention we make new compounds of the formula—

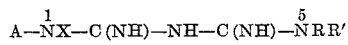

wherein A represents an aryl group, X represents hydrogen or an alkyl group, R represents an alkyl radical, R' represents hydrogen or an alkyl radical and also R and R' may be joined together to form a divalent aliphatic hydrocarbon chain, and further any or all of the groups A, R and R' may bear one or more non-acidic substituents, by a process comprising bringing into reaction an aryl-dicyandiamide of the formula

with an amine of the formula NHRR', the symbols A, X, R and R' in these formulae having the same meanings as before.

The reaction is conveniently brought about by heating the reagents together, if desired in presence of a solvent or diluent which for convenience may be an excess of the amine when this is liquid under the reaction conditions employed.

The amine may be used either in the form of the free base, or in the form of a salt. Further where R and R' are aliphatic the reaction may be advantageously carried out in the presence of a metal such as zinc or copper which may be used as such or in the form of an oxide, hydroxide or salt or a pre-formed addition compound with the amine. There may be used, for instance, copper powder, hydrated copper oxide, copper sulphate or zinc chloride. We find that in such cases, the presence of the metal increases the speed of the reaction and improves the yield of the biguanide. Also the biguanide can frequently be conveniently isolated directed from the reaction mixture in the form of a sparingly soluble complex with the metal salt.

The aryl dicyandiamides used as starting materials are a known class of compounds. They have been described by Walther and Grieshammer, Journal für praktische Chemie (2), vol. 92, pp. 209–255. They are more conveniently obtained by the method described in U. S. Patent 2,409,832.

The di-, tri- or tetra-substituted biguanides made according to this invention are strong bases; they form stable salts with organic and inorganic acids, which in many cases are freely soluble in water. The salts can be made by dissolving the biguanides in aqueous solutions of the acid and then evaporating off the water, but they are more conveniently obtained in a dry form by mixing the components together in an organic solvent such as acetone, or an alcohol in which the salts are sparingly soluble. In this manner there may be readily formed, for example, the salts with acetic acid, lactic acid, methane sulphonic acid, methylene-disalicylic acid, methylene-bis-β-hydroxynaphthoic acid, and hydrochloric acid.

The following examples illustrate, but do not limit, the invention. The parts are by weight.

Example 1

19.5 parts of p-chlorophenyl dicyandiamide, 20 parts of diethylamine, 140 parts of ethyl alcohol, and a solution of 12.5 parts of copper sulphate pentahydrate in 60 parts of water, are mixed and the mixture is stirred and heated under reflux for 2 hours. The resultant suspension is cooled, diluted with 300 parts of water and filtered. The light-brown solid residue which is mainly the copper complex of Nα-p-chlorophenyl-Nω-diethylbiguanide, is dissolved in a mixture of 100 parts of 36% hydrochloric acid and 600 parts of water. A solution of 40 parts of sodium sulphide nonahydrate in 100 parts of water is slowly added. Copper sulphide is precipitated and is filtered off. The clear filtrate is made strongly alkaline with caustic soda. The precipitate of the crude biguanide so formed is collected, dried and crystallised from petroleum ether. It forms colourless needles which melt at 133°–134° C. uncorr.

In a similar manner, there may be obtained the following biguanides having the melting points indicated.

*Ex. 2.*—Nα-phenyl-Nω-diethylbiguanide; colourless prisms from petroleum ether, M. P. 100°–101° C.

*Ex. 3.*—Nα-p-tolyl-Nω-dimethylbiguanide; colourless plates from toluene, M. P. 149°–149.5° C. uncorr.

*Ex. 4.*—Nα-3:4-dimethyl phenyl-Nω-diethylbiguanide; colourless plates from petroleum ether, M. P. 70°–71° C.

Whereas it will be apparent to one skilled in the art that many variations and embodiments of this invention additional to those specifically described above may be made without departing from the spirit and scope thereof, it is to be understood that the invention is not in any way limited to the embodiments illustrated, but only as defined in the following claims.

We claim:

1. A compound selected from the group consisting of the salts and free-base form of the unsymmetrical 1,5-substituted biguanides having the following formula:

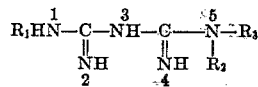

wherein $R_1$ is a monocyclic aryl group and $R_2$ and $R_3$ are lower alkyl groups.

2. $N^1$-phenyl-$N^5$-diethylbiguanide.
3. $N^1$-p-tolyl-$N^5$-dimethylbiguanide.

FRANCIS HENRY SWINDEN CURD.
FRANCIS LESLIE ROSE.

REFERENCES CITED

The following references are of record in the file of this patent:

UNITED STATES PATENTS

| Number | Name | Date |
|---|---|---|
| 2,331,377 | D'Alelio | Oct. 12, 1943 |
| 2,455,896 | Nagy et al. | Dec. 7, 1948 |
| 2,467,371 | Curd et al. | Apr. 19, 1949 |

FOREIGN PATENTS

| Number | Country | Date |
|---|---|---|
| 577,843 | Great Britain | June 3, 1946 |

OTHER REFERENCES

Curd et al.: J. Chem. Soc. (London), Aug. 1946, pp. 733 and 736.